(12) United States Patent
Clark (10) Patent No.: US 11,365,975 B2
(45) Date of Patent: Jun. 21, 2022

(54) VISUAL CONFIRMATION SYSTEM FOR DRIVER ASSIST SYSTEM

(71) Applicant: Honda Motor Co., Ltd., Tokyo (JP)

(72) Inventor: Dennis Patrick Clark, Menlo Park, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 16/144,019

(22) Filed: Sep. 27, 2018

(65) Prior Publication Data

US 2020/0103235 A1   Apr. 2, 2020

(51) Int. Cl.
| | | |
|---|---|---|
| G01C 21/32 | (2006.01) |
| G06V 20/58 | (2022.01) |
| G01S 19/39 | (2010.01) |
| G06F 16/29 | (2019.01) |
| G01C 21/36 | (2006.01) |
| G06F 16/587 | (2019.01) |
| G01S 19/14 | (2010.01) |
| G06V 20/59 | (2022.01) |
| G06V 40/19 | (2022.01) |

(52) U.S. Cl.
CPC ......... *G01C 21/32* (2013.01); *G01C 21/3602* (2013.01); *G01S 19/14* (2013.01); *G01S 19/39* (2013.01); *G06F 16/29* (2019.01); *G06F 16/587* (2019.01); *G06V 20/58* (2022.01); *G06V 20/597* (2022.01); *G06V 40/19* (2022.01)

(58) Field of Classification Search
CPC ..... G01C 21/32; G01C 21/3602; G06F 16/29; G06F 16/587; G01S 19/39; G01S 19/14; G06K 9/00805; G06K 9/00845; G06K 9/00604
See application file for complete search history.

(56) References Cited

U.S. PATENT DOCUMENTS

| | | | |
|---|---|---|---|
| 7,072,753 B2 | 7/2006 | Eberle et al. |
| 7,652,583 B2 | 1/2010 | Sanchez et al. |
| 7,982,620 B2 | 7/2011 | Prokhorov et al. |
| 9,043,956 B2 | 6/2015 | Baumgarten et al. |
| 9,113,837 B2 | 8/2015 | Li et al. |
| 9,483,927 B2 | 11/2016 | Wolter et al. |
| 9,823,657 B1 | 11/2017 | Palmer et al. |
| 9,884,628 B1 * | 2/2018 | Grant ................ B60W 50/0098 |

(Continued)

*Primary Examiner* — Abby Y Lin
*Assistant Examiner* — Sohana Tanju Khayer
(74) *Attorney, Agent, or Firm* — Rankin, Hill & Clark LLP (57) ABSTRACT

A system for visual awareness confirmation may include an image capture device, a global positioning system, a processor, and an input/output device. The image capture device may capture an image of an operating environment through which a vehicle is travelling. The GPS may determine an associated position of the vehicle and an orientation of the image capture device, and associate the position of the vehicle with the image captured by the image capture device. The processor may identify a feature of the operating environment and formulate a question related to the feature. The I/O device may present the question to an occupant of the vehicle and receive a response to the question from the occupant of the vehicle. The processor may cross-reference data associated with the feature and the response and update an object recognition database based on the cross-referencing.

20 Claims, 5 Drawing Sheets

(56) References Cited

U.S. PATENT DOCUMENTS

| | | | |
|---|---|---|---|
| 9,892,613 B2 | 2/2018 | Birnie et al. | |
| 9,904,287 B1* | 2/2018 | Kuffner, Jr | G06T 19/006 |
| 9,908,535 B1 | 3/2018 | Palmer et al. | |
| 2005/0128092 A1* | 6/2005 | Bukman | A61B 5/18 |
| | | | 340/576 |
| 2008/0061999 A1* | 3/2008 | Birk | B60K 28/02 |
| | | | 340/686.1 |
| 2016/0001781 A1* | 1/2016 | Fung | B60K 28/02 |
| | | | 701/36 |
| 2016/0311440 A1* | 10/2016 | Gan | G08B 21/06 |
| 2018/0072327 A1* | 3/2018 | Seppelt | B60W 50/14 |
| 2018/0188045 A1* | 7/2018 | Wheeler | G06K 9/00791 |

\* cited by examiner

VISUAL CONFIRMATION SYSTEM FOR DRIVER ASSIST SYSTEM

BACKGROUND

Modern automotive vehicles include increasing technology for a variety of purposes. For example, there are known systems that assist drivers in avoiding collisions. A variety of sensor and camera technologies are available to assist a driver in determining that an object or another vehicle is in or likely to enter the potential path of the vehicle, such as when the driver intends to move in a reverse direction or change lanes. Such systems may alert the driver regarding a condition near the vehicle through visual or audible indications and may also monitor the driver's attention level.

BRIEF DESCRIPTION

According to one aspect, a system for visual awareness confirmation may include an image capture device, a global positioning system (GPS), a processor, and an input/output (I/O) device. The image capture device may capture an image of an operating environment through which a vehicle is travelling. The GPS may determine an associated position of the vehicle and an orientation of the image capture device, and associate the position of the vehicle with the image captured by the image capture device. The processor may identify a feature of the operating environment and formulate a question related to the feature. The I/O device may present the question to an occupant of the vehicle and receive a response to the question from the occupant of the vehicle. The processor may cross-reference data associated with the feature and the response to the question received from the occupant of the vehicle.

The I/O device may include a display, a touchscreen, a speaker, or a microphone. The system for visual awareness confirmation may include a sensor monitoring an awareness state of a driver of the vehicle. The processor may formulate the question related to the feature based on the awareness state of the driver of the vehicle and the I/O device may present the question to the driver of the vehicle based on the awareness state of the driver. The I/O device may present the question to the driver of the vehicle based on an awareness threshold.

The processor may identify the feature of the operating environment based on an eye gaze location of the driver of the vehicle. The processor may identify the feature of the operating environment based on a steering wheel pressure associated with a steering wheel of the vehicle. The processor may update data associated with the feature within an object recognition database based on the response to the question received from the occupant of the vehicle. The I/O device may provide an alert to the occupant of the vehicle based on the cross-reference resulting in a discrepancy above a discrepancy threshold. The vehicle may operate in an autonomous mode.

According to one aspect, a system for visual awareness confirmation may include a sensor, an image capture device, a global positioning system (GPS), a processor, a display, a speaker, a touchscreen, or a microphone. The sensor may be an awareness sensor monitoring an awareness state of a driver of a vehicle. The image capture device may capture an image of an operating environment through which the vehicle is travelling. The GPS may determine an associated position of the vehicle and orientation of the image capture device, and associate the position of the vehicle with the image captured by the image capture device. The processor may identify a feature of the operating environment and formulate a question related to the feature based on the awareness state of the driver. The display or the speaker may present the question to the driver of the vehicle based on the awareness state of the driver. The touchscreen or the microphone may receive a response to the question from the driver of the vehicle. The processor may cross-reference data associated with the feature and the response to the question received from the occupant of the vehicle.

The sensor may be an eye gaze sensor monitoring an eye gaze location of the driver of the vehicle. The processor may identify the feature of the operating environment based on the eye gaze location. The sensor may be a steering wheel pressure sensor monitoring a steering wheel pressure associated with a steering wheel of the vehicle. The sensor may be a steering angle sensor monitoring a steering angle of the vehicle or a change in the steering angle of the vehicle.

According to one aspect, a method for visual awareness confirmation may include capturing an image of an operating environment through which a vehicle is travelling, determining an associated position of the vehicle and an orientation of an image capture device capturing the image, and associating the position of the vehicle with the image, identifying a feature of the operating environment, formulating a question related to the feature, presenting the question to an occupant of the vehicle, receiving a response to the question from the occupant of the vehicle, and cross-referencing data associated with the feature and the response to the question received from the occupant of the vehicle.

The method may include monitoring an awareness state of a driver of the vehicle. The method may include formulating the question related to the feature based on the awareness state of the driver of the vehicle and presenting the question to the driver of the vehicle based on the awareness state of the driver or presenting the question to the driver of the vehicle based on an awareness threshold. The method may include identifying the feature of the operating environment based on an eye gaze location of the driver of the vehicle or identifying the feature of the operating environment based on a steering wheel pressure associated with a steering wheel of the vehicle.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

Figure 1:
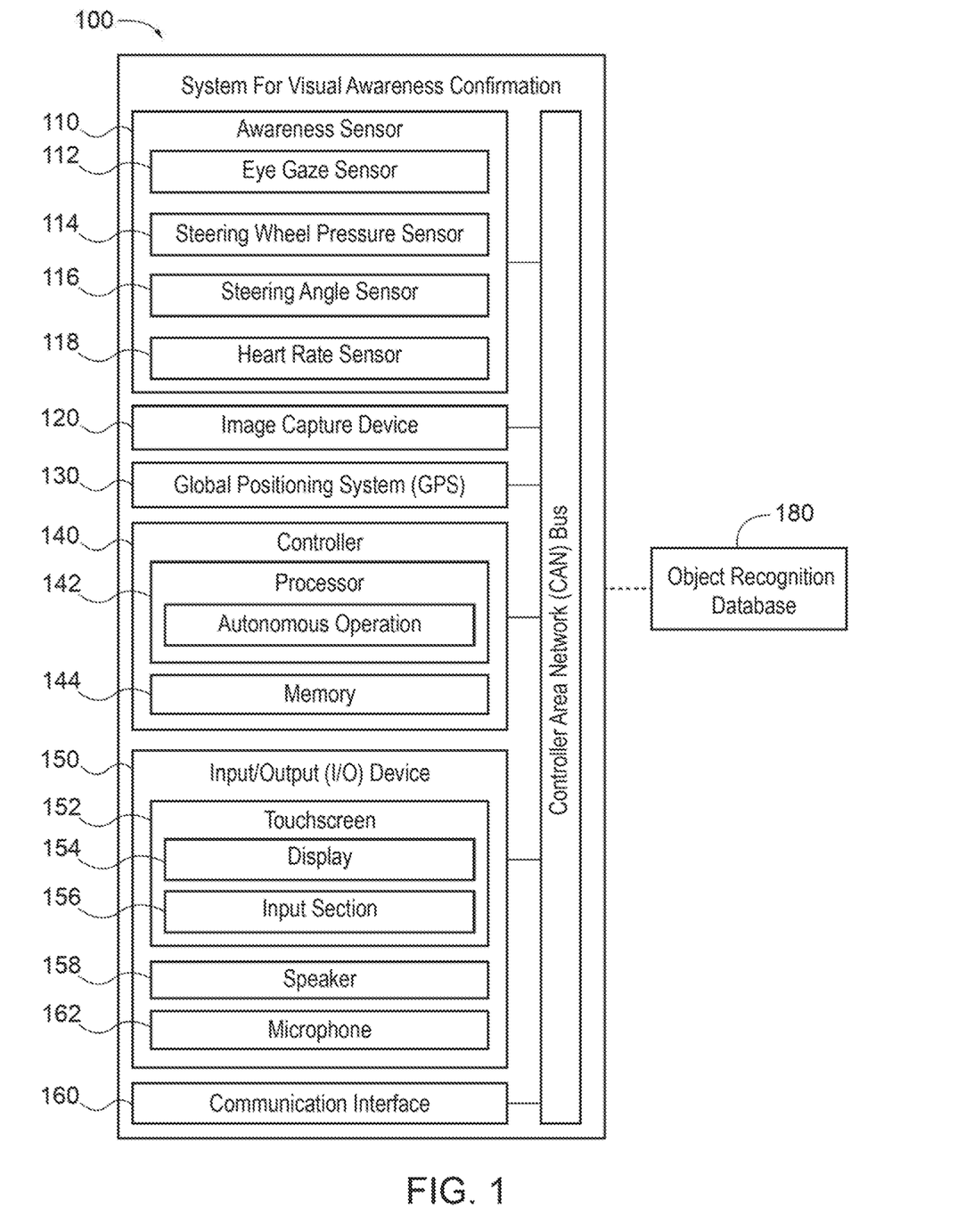
FIG. 1 is an illustration of an exemplary component diagram of a system for visual awareness confirmation, according to one aspect.

In this regard, one or more of the components of the system for visual awareness confirmation of FIG. 1 may be operably connected to one another, such as via the CAN bus and perform computer communication with one another.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an illustration of an exemplary component diagram of a system 100 for visual awareness confirmation, according to one aspect. The system 100 for visual awareness confirmation may include a sensor 110, which may be an awareness sensor 110 and/or include one or more of an eye gaze sensor 112, a steering wheel pressure sensor 114, a steering angle sensor 116, a heart rate sensor 118, etc. The system 100 for visual awareness confirmation may include an image capture device 120, a global positioning system (GPS) 130, and a controller 140 which may include a processor 142 and a memory 144. The system 100 for visual awareness confirmation may include an input/output (I/O) device 150, which may include a touchscreen 152, a display 154, an input section 156, a speaker 158, a microphone 162, etc. The system 100 for visual awareness confirmation may include a communication interface 160 and a controller area network (CAN) bus 170.

The communication interface 160 may transmit information, such as cross-reference information to an object recognition database 180 stored on a server 182. According to one aspect, the system 100 for visual awareness confirmation may include the object recognition database 180. According to other aspects, the object recognition database 180 may be separately maintained.

According to one aspect, the sensor 110 may be an awareness sensor 110. The awareness sensor 110 may be setup to detect an awareness level or an awareness state associated with a driver or an occupant of the vehicle. The sensor 110 or awareness sensor 110 may be the eye gaze sensor 112, the steering wheel pressure sensor 114, the steering angle sensor 116, the heart rate sensor 118, etc. In other words, the readings from these sensors may be utilized by the processor 142 to determine or infer the awareness level or the awareness state of the driver of the occupant of the vehicle.

For example, if the eye gaze sensor 112 detects that the driver's eyes are fluttering or that the driver's eyes are drooping, the processor 142 may infer that the driver's awareness state or awareness level is low. The steering wheel pressure sensor 114 may be used to infer driver awareness based on an amount of pressure placed on the steering wheel by the driver. The steering angle sensor 116 may be used to infer driver awareness based on a change in steering angle provided to the steering wheel of the vehicle. Similarly, the heart rate sensor 118 may be used to infer driver awareness states based on a measured heart rate from the driver of the vehicle. For example, if the driver's heart rate lowers over time, this may be used to infer that the driver awareness state or driver awareness level of the driver of the vehicle is falling. In any event, the sensor 110 may monitor the awareness state of the driver of the vehicle or changes in the awareness state of the driver of the vehicle and report these readings to the controller 140 or the processor 142. The readings for the driver awareness state may be stored to the memory 144. According to one aspect, the awareness sensor 110 may operate to capture these driver awareness state readings when the controller 140 is operating the vehicle in an autonomous mode or a semi-autonomous mode. In this way, driver awareness during semi-autonomous or autonomous operation may be monitored, maintained, or managed by the system 100 for visual awareness confirmation.

Figure 3:
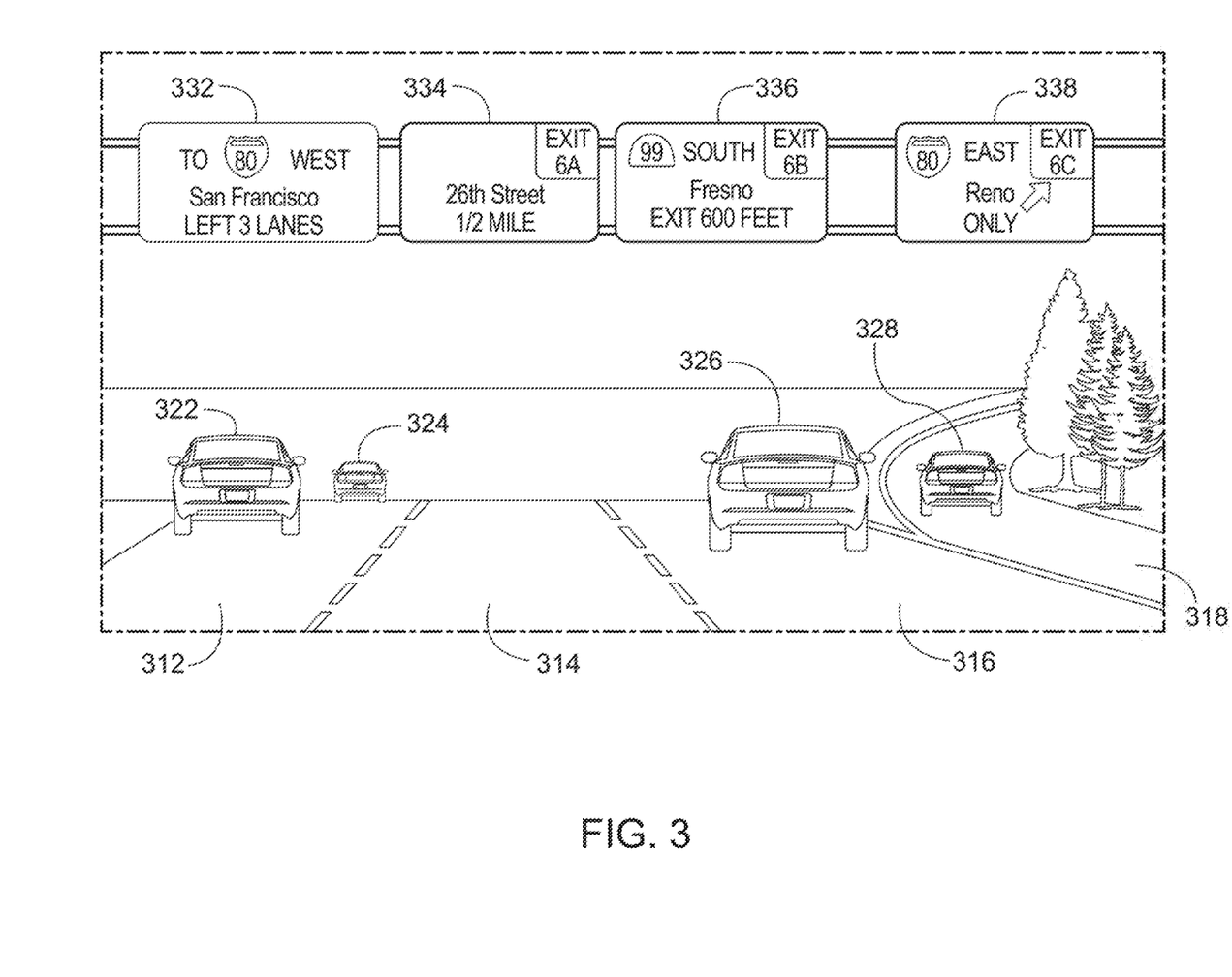
FIG. 3 is an illustration of an exemplary scenario where the system for visual awareness confirmation of FIG. 1 or the method for visual awareness confirmation of FIG. 2 may be implemented, according to one aspect.

According to one aspect, the image capture device 120 may be oriented in a forward facing direction of the vehicle and may capture one or more images of an operating environment as the vehicle travels. In other words, the image capture device 120 may capture an image of the operating environment through which the vehicle is travelling. FIG. 3 is an illustration of an exemplary captured image of the operating environment.

According to one aspect, the GPS 130 may determine an associated position for the vehicle and an orientation of the image capture device 120 (e.g., a bearing or a heading of the vehicle). This position information and orientation information may be pass off or transmitted by the communication interface 160 to the server 182 or information may be received from the server 182, such as the object recognition database 180, to facilitate identification of features of the operating environment. Stated another way, processing may occur system-side, using the processor 142 of the controller 140 to identify a feature of the operating environment or server-side, at the server 182 of the object recognition database 180, for example.

The GPS 130 (or the processor 142) may associate the position of the vehicle with the image captured by the image capture device 120. Using the position of the vehicle, the orientation of the vehicle (e.g., orientation, bearing, or heading of the image capture device 120, as mounted to the vehicle), and feature detection, the processor 142 of the system 100 for visual awareness confirmation or a processor of the server 182 may identify or select a feature of the operating environment. In other words, the image captured by the image capture device 120 may be transmitted, according to some aspects, to the server 182, and the processor of the server 182 may perform feature recognition on the image to determine or select features for question formulation. Similarly, the question formulation may occur system-side, vehicle-side, device-side, or server-side. Explained yet another way, according to some aspects, the communication interface 160 may transmit the captured image to the server 182 for processing, and the server 182 may identify the feature of the image of the operating environment rather than the processor 142 of the system for driver awareness confirmation. According to other aspects, the image may not be transmitted to the server 182, and the processor 142 of the system for driver awareness confirmation may perform the identification of the feature of the image of the operating environment.

According to one aspect, the controller 140 or the processor 142 may identify features which are pre-identified or already have associated data entries in the object recognition database 180. For example, a landmark may be prominent or easily identifiable day or night while driving along an interstate. Based on the GPS location provided, orientation of the vehicle, and the existing data entry in the object recognition database 180, the landmark may be identified from the image of the operating environment. According to this aspect, the occupant or the driver of the vehicle may be 'tested'. In other words, the processor 142 may formulate a question related to the feature, the I/O device 150 may present the question to the occupant of the vehicle, and receive a response to the question from the occupant of the vehicle.

According to this aspect, because it is known what the feature is already, based on the information from the object recognition database 180, the processor 142 may cross-reference data associated with the feature within the object recognition database 180 and the response to the question received from the occupant of the vehicle in a manner to test the awareness level of the occupant or the driver. For example, if the driver's awareness level or awareness state is below a threshold awareness level, the processor 142 may identify the known feature, identified from the captured image and the data from the object recognition database 180, and pose the question to the occupant of the vehicle related to the known feature.

Examples of questions pertaining to features may be "what color is the landmark?", "what is on the right hand side of the road", "what is the name listed on the road sign there", "what restaurant did we just pass", "how many lanes are in this roadway", "how many cars are ahead of you or behind you", "what color is the truck to your left", etc. In this way, the system 100 for visual awareness confirmation may request confirmation from the driver or the occupant of the vehicle that he or she is visually aware or alert with regard to the surroundings within the operating environment and the I/O device 150 may present the question to the driver of the vehicle based on the awareness state of the driver or according to the awareness threshold.

According to one aspect, the question formulated may not necessarily be associated with data which pre-exists in the object recognition database 180. For example, questions about the operating environment may be posed and presented to the occupant of the vehicle. In other words, the processor 142 may identify features of the operating environment, such as a number of vehicles in front of the current vehicle. The processor 142 may formulate the question related to the feature (e.g., the number of vehicles visible to the driver), and the I/O device 150 may present or pose that question to the occupant of the vehicle. For example, the I/O device 150 may pose the question "how many vehicles are in front of you?" to the occupant of the vehicle. The I/O device 150 may receive a response from the occupant of the vehicle and the processor 142 may cross-reference data associated with the feature and the response to the question received from the occupant of the vehicle in a verification type format. If the response from the occupant is incorrect, the 'test' is failed and the I/O device 150 may provide an alert to the occupant of the vehicle based on the cross-reference resulting in a discrepancy above a discrepancy threshold. For example, if there are two cars in the near distance and a third card further ahead, multiple answers may be acceptable (i.e., two or three). According to one aspect, no response from the occupant may also result in the alert being provided to the occupant of the vehicle.

Questions may be designed or formulated to influence the focus of the driver. For example, the processor 142 may identify the feature of the operating environment based on an eye gaze location of the driver of the vehicle. In other words, if the eye gaze location of the driver is not on the roadway or at a desired focus location, the feature identified or selected by the processor 142 may be near a point of desired focus, such as near a pedestrian crossing the road. According to one aspect, the question may be directed to the point of desired focus itself. For example, the processor 142 may select the pedestrian and pose the question to the driver, "do you see that pedestrian over there?" or "what color shirt is that pedestrian wearing". In this way, the system 100 for visual awareness confirmation may facilitate refocusing of the driver's attention or eye gaze. According to other aspects, the processor 142 may identify the feature of the operating environment based on a steering wheel pressure associated with a steering wheel of the vehicle.

According to other aspects, the system 100 for visual awareness confirmation may be utilized to build the object recognition database 180, rather than and/or in addition to testing the occupant of the vehicle for awareness. For example, if the occupant of the vehicle is detected to be below the awareness threshold level or awareness state, the feature of the operating environment may be identified. As another example, the building of the object recognition database 180 may occur when the occupant of the vehicle is detected to be above an awareness threshold level or awareness state (e.g., to maintain the quality of the database being built). In other words, the object recognition database 180 may be built based on responses to questions which may be posed while the occupant is above an alertness level, so that his or her answers may be considered to be of higher quality or more accurate than when the occupant's alertness or awareness level is lower. Unlike the scenarios described above, the feature which is identified may be unknown or may not yet exist as an entry in the object recognition database 180. In this way, the processor 142 may formulate the question related to the feature based on the awareness state of the driver of the vehicle.

In this regard, the question formulated by the processor 142 may include a series of questions, such as a first question associated with confirming the feature in question, and a second question associated with gathering information about the feature for building the object recognition database 180. For example, the first question may be, "do you see that landmark over there, lit up in red?", while the second question may be "what is the name of that landmark?" Thereafter, when the questions have been presented to the occupant of the vehicle and the response has been received, the processor 142 may cross-reference the data associated with the feature and the response to the question by building an entry for the database to, for example, name the associated landmark. In this way, the processor 142 may update or build data associated with the feature within the object recognition database 180 based on the response to the question received from the occupant of the vehicle.

According to one aspect, the I/O device 150 may include the display 154, the touchscreen 152, the speaker 158, or the microphone 162. The display 154 may render or display the formulated question to the occupant and the speaker 158 may audibly play or present the question to the occupant. The touchscreen 152 may include the input section 156 or a keyboard which enables data entry as a response. The microphone 162 may also be used to receive voice samples as the response to the question. The processor 142 or the processor of the server 182 may perform voice to text recognition to verify the response of the occupant. According to the aspect where the voice recognition is performed server-side, the communication interface 160 may transmit the voice signal or voice sample to the server 182, which may transmit the text to speech (TTS) sample back to the system 100 for visual awareness confirmation.

According to one aspect, the CAN bus 170 may facilitate computer communication between components of the system 100 for visual awareness confirmation. In other words, the CAN bus 170 may communicatively couple the sensor 110, the image capture device 120, the GPS 130, the controller 140 (including the processor 142 and the memory 144), the I/O device 150, the communication interface 160 (which may include a transmitter, a receiver, a transceiver, etc.), etc.

According to one aspect, the image capture device 120 may be an image capture device of a mobile device. According to one aspect, the GPS 130 may be the GPS of the mobile device. Similarly, the I/O device 150 may be implemented via the I/O hardware of the mobile device. According to this aspect (i.e., implementation via one or more aspects of the mobile device), the mobile device may be communicatively coupled to the system 100 for visual awareness confirmation via a wireless connection, such as Bluetooth, for example. The mobile device may include the system 100 for visual awareness confirmation or one or more components of the system 100 for visual awareness confirmation. The mobile device may be mounted to the vehicle and may be forward facing, for example. The mobile device may include a processor and a memory, and the image capture device 120, which may obtain or capture the image of the operating environment. The processor of the mobile device may identify the feature of the operating environment for which to formulate a related question or offload this responsibility to the server 182. Regardless, the mobile device may employ its own hardware (e.g., speakers, display, touchscreen, microphone, etc.) to identify the feature, formulate the question related to the feature, present this question to the occupant of the vehicle, record the response to the question, and cross-reference the feature with the response accordingly.

As previously discussed, the response may be utilized to train the object recognition database 180 (e.g., associate the response with a data entry or create a data entry for the database) or merely to test the occupant's awareness state or level (e.g., and provide an alert if the response is incorrect or inconsistent with the existing data entry or determined feature). For example, the I/O device 150 may provide the alert to the occupant of the vehicle based on the cross-reference resulting in a discrepancy above a discrepancy threshold (e.g., which may be based on a standard deviation, a number, a predetermined threshold, etc.).

The object recognition database 180 may be stored on the server 182 and may be accessed via the communication interface 160. The object recognition database 180 may include data pertaining to or related to one or more objects (e.g., features) within the operating environment. The data may include GPS location data associated with the object, a size of the object, a color of the object, a name of the object, one or more attributes associated with the object, a number associated with the object, a fact associated with the object, etc. In this way, the processor 142 may formulate one or more questions associated with the object or feature, as described herein.

Figure 2:
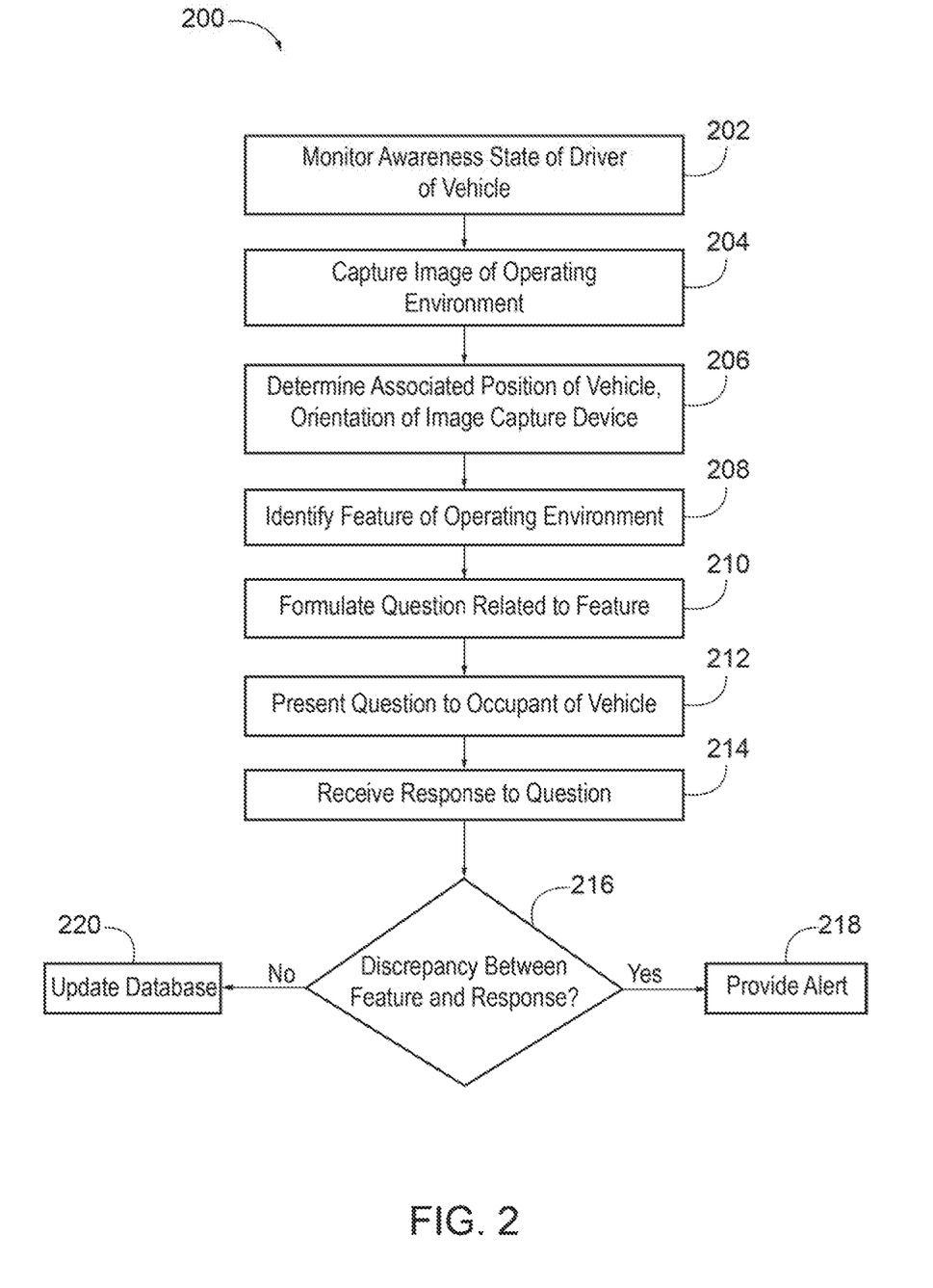
FIG. 2 is an illustration of an exemplary flow diagram of a method for visual awareness confirmation, according to one aspect.

FIG. 2 is an illustration of an exemplary flow diagram of a method 200 for visual awareness confirmation, according to one aspect. The method 200 for visual awareness confirmation may include monitoring 202 an awareness state of a driver of a vehicle equipped with the system 100 for visual awareness confirmation. The awareness state of the driver of the vehicle may be expressed as a number or as an awareness level, for example. The method 200 for visual awareness confirmation may include capturing 204 an image of an operating environment through which the vehicle is travelling. The image of the operating environment may be associated with a position of the vehicle, as determined 206 by the GPS 130, and the orientation of an associated image capture device 120 may be obtained. The method 200 may include sensing or detecting (e.g., camera based Advanced Driver Assistance Systems (ADAS) vehicle system with computer vision) the image.

In this regard, the method 200 for visual awareness confirmation may include identifying a feature of the operating environment or analyzing a feature of an environment through which the autonomous vehicle is travelling. The feature may be identified 208 using or based on the captured image, the position of the vehicle, or the orientation of the image capture device 120 used to capture the image of the operating environment. The method 200 for visual awareness confirmation may include formulating 210 a question related to the identified feature from the image of the operating environment or posing the question to the occupant of the autonomous vehicle related to the feature.

According to one aspect, the question may relate to objects within the operating environment, and may be designed to refocus the driver's attention to the roadway. In other words, to answer the question, the driver may inadvertently redirect his or her eyes to a desired or anticipated location, thereby facilitating visual awareness confirmation. The method 200 for visual awareness confirmation may include presenting 212 the formulated question to an occupant of the vehicle, such as a driver of the vehicle. As previously discussed, the question may be presented via the display 154 or via the speaker(s) 158. The method 200 for visual awareness confirmation may include receiving 214 a response to the question. The response may be received by the input section 156 of the touchscreen, the microphone 162, a keyboard, or other I/O device 150 interface.

The method 200 for visual awareness confirmation may include cross-referencing the response to the question against data associated with the identified feature within the object recognition database 180. In performing this cross-referencing, a discrepancy 216 may be determined. Stated another way, the method 200 for visual awareness confirmation may include determining whether the discrepancy exists between the response and the feature (e.g., data associated with the feature from the object recognition database 180 or data from the image of the operating environment). If the discrepancy does exist, an alert may be provided 218. The alert may be indicative to the driver or the occupant of the vehicle that more attention should be paid to vehicle operations. If no discrepancy exists, the object recognition database 180 may be updated 220 or supplemented to confirm the existence of the feature, as detected according to the captured image. According to one aspect, if no data associated with the feature exists as an entry to the object recognition database 180, the driver's response may be utilized to build the object recognition database 180 or updating the object recognition database 180 based on the response of the occupant (e.g., which may be received via an Onboard Voice agent user interface system or other vehicle system). In this way, visual awareness confirmation may be provided, and the method 200 for visual awareness confirmation may utilize an onboard voice agent to periodically query the driver or occupant about the scene to ensure that the occupant is engaged and to update the object recognition database 180 or other database accordingly. Thus, the driver or occupant of the vehicle may be alerted and the database may be trained in a concurrent fashion.

FIG. 3 is an illustration of an exemplary scenario where the system 100 for visual awareness confirmation of FIG. 1 or the method 200 for visual awareness confirmation of FIG. 2 may be implemented, according to one aspect. In FIG. 3, it can be seen that the operating environment includes a first lane 312, a second lane 314, a third lane 316, and an exit ramp 318. Additionally, other vehicles 322, 324, 326, 328 may be seen. Further, each lane is associated with signage 332, 334, 336, 338. In this regard, the processor 142 may select or identify one or more features from the operating environment to formulate a query, a challenge, or a question. As indicated above, the query may be formulated to direct the eye gaze of the driver to a desired location, for example. According to one aspect, the question may be formulated as, "how many cars are in the lane to your left". If the vehicle is in lane 314, it may be seen that two vehicles 322, 324 are in the lane to the left.

Accordingly, the disclosure enables driver or occupant awareness or attentiveness to be tested or confirmed (e.g., periodically, or based on awareness levels) by asking questions, querying the occupant, testing the occupant, or otherwise presenting challenges to occupants of the vehicle to ensure that they are paying attention to the surrounding environment. Challenges may be formulated to pertain to features of the environment, such as other vehicles, objects, landmarks, pedestrians, etc. In this way, a database (e.g., feature database or object recognition database 180) relating to object or feature recognition may also be trained (e.g., discrepancies between driver and system can be flagged and used to train the system or database).

Figure 4:
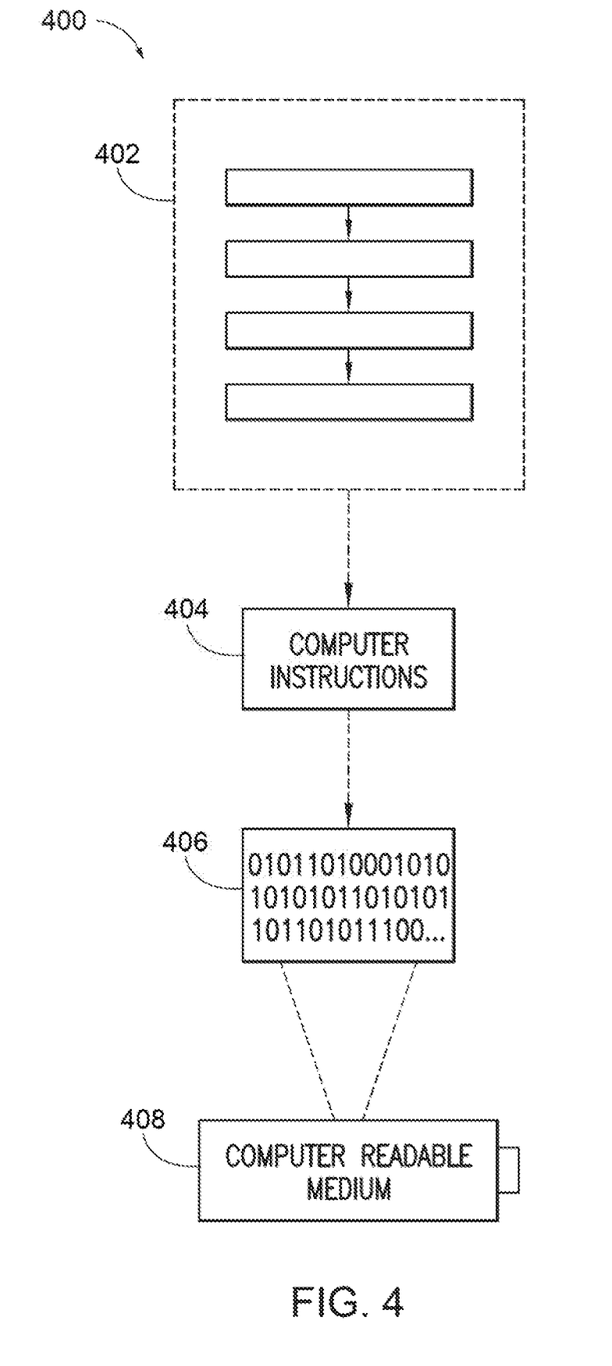
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 200 of FIG. 2. In another aspect, the processor-executable computer instructions 404 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
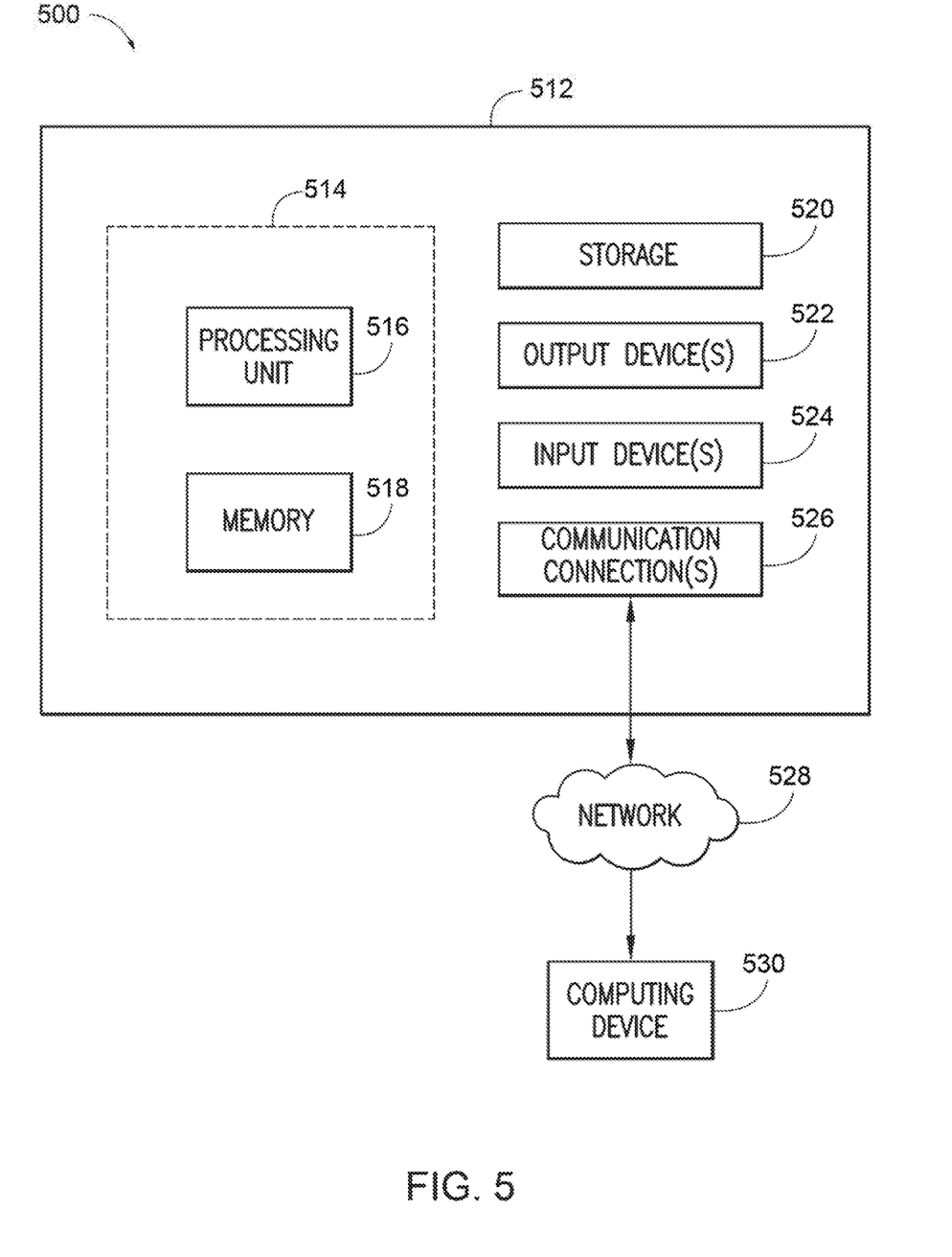
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one aspect provided herein. In one configuration, the computing device 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the computing device 512 includes additional features or functionality. For example, the computing device 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 512. Any such computer storage media is part of the computing device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 512 includes input device(s) 524 such as keyboard, mouse, pen, voice input device, touch input device, infrared cameras, video input devices, or any other input device. Output device(s) 522 such as one or more displays, speakers, printers, or any other output device may be included with the computing device 512. Input device(s) 524 and output device(s) 522 may be connected to the computing device 512 via a wired connection, wireless connection, or any combination thereof. In one aspect, an input device or an output device from another computing device may be used as input device(s) 524 or output device(s) 522 for the computing device 512. The computing device 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system, comprising:
   an image capture device capturing an image of an operating environment through which a vehicle is travelling;
   a global positioning system (GPS) determining an associated position of the vehicle and an orientation of the image capture device, and associating the position of the vehicle with the image captured by the image capture device;
   a processor:
   identifying a feature of the operating environment; and
   formulating a question related to the feature of the operating environment from the image captured by the image capture device to direct eye gaze of a driver to a desired location associated with the feature of the operating environment, wherein the processor identifies the feature of the operating environment based on a data entry for an object recognition database associated with the feature being non-existent; and
   an input/output (I/O) device:
   presenting the question relating to the feature of the operating environment from the image to an occupant of the vehicle; and
   receiving a response to the question from the occupant of the vehicle;
   wherein the processor cross-references data associated with the feature and the response to the question received from the occupant of the vehicle, and
   wherein the processor creates the data entry for the object recognition database based on the response to the question.

2. The system for visual awareness confirmation of claim 1, wherein the I/O device includes a display, a touchscreen, a speaker, or a microphone.

3. The system for visual awareness confirmation of claim 1, comprising a sensor monitoring an awareness state of the driver of the vehicle.

4. The system for visual awareness confirmation of claim 3:
   wherein the processor formulates the question related to the feature based on the awareness state of the driver of the vehicle; and
   wherein the I/O device presents the question to the driver of the vehicle based on the awareness state of the driver.

5. The system for visual awareness confirmation of claim 3, wherein the I/O device presents the question to the driver of the vehicle based on an awareness threshold.

6. The system for visual awareness confirmation of claim 3, wherein the processor identifies the feature of the operating environment based on an eye gaze location of the driver of the vehicle.

7. The system for visual awareness confirmation of claim 3, wherein the processor infers driver awareness based on a steering wheel pressure associated with a steering wheel of the vehicle.

8. The system for visual awareness confirmation of claim 1, wherein the processor updates data associated with the feature within the object recognition database based on the response to the question received from the occupant of the vehicle.

9. The system for visual awareness confirmation of claim 1, wherein the I/O device provides an alert to the occupant of the vehicle based on the cross-reference resulting in a discrepancy above a discrepancy threshold.

10. The system for visual awareness confirmation of claim 1, wherein the vehicle is operating in an autonomous mode.

11. A system comprising:
    a sensor monitoring an awareness state of a driver of a vehicle;
    an image capture device capturing an image of an operating environment through which the vehicle is travelling;
    a global positioning system (GPS) determining an associated position of the vehicle and orientation of the image capture device, and associating the position of the vehicle with the image captured by the image capture device;
    a processor:
    identifying a feature of the operating environment; and
    formulating a question related to the feature of the operating environment from the image captured by the image capture device based on the awareness state of the driver to direct eye gaze of the driver to a desired location associated with the feature of the operating environment, wherein the processor identifies the feature of the operating environment based on a data entry for an object recognition database associated with the feature being non-existent;
    a display or a speaker presenting the question relating to the feature of the operating environment from the image to the driver of the vehicle based on the awareness state of the driver; and
a touchscreen or a microphone receiving a response to the question from the driver of the vehicle;
wherein the processor cross-references data associated with the feature and the response to the question received from the occupant of the vehicle, and
wherein the processor creates the data entry for the object recognition database based on the response to the question.

12. The system for visual awareness confirmation of claim 11:
wherein the sensor is an eye gaze sensor monitoring an eye gaze location of the driver of the vehicle; and
wherein the processor identifies the feature of the operating environment based on the eye gaze location.

13. The system for visual awareness confirmation of claim 11, wherein the sensor is a steering wheel pressure sensor monitoring a steering wheel pressure associated with a steering wheel of the vehicle.

14. The system for visual awareness confirmation of claim 11, wherein the sensor is a steering angle sensor monitoring a steering angle of the vehicle or a change in the steering angle of the vehicle.

15. A method, comprising:
capturing an image of an operating environment through which a vehicle is travelling;
determining an associated position of the vehicle and an orientation of an image capture device capturing the image, and associating the position of the vehicle with the image;
identifying a feature of the operating environment based on a data entry for an object recognition database associated with the feature being non-existent;
formulating a question related to the feature of the operating environment from the image captured by the image capture device to direct eye gaze of a driver to a desired location associated with the feature of the operating environment;
presenting the question relating to the feature of the operating environment from the image to an occupant of the vehicle;
receiving a response to the question from the occupant of the vehicle;
cross-referencing data associated with the feature and the response to the question received from the occupant of the vehicle; and
creating the data entry for the object recognition database based on the response to the question.

16. The method for visual awareness confirmation of claim 15, comprising monitoring an awareness state of the driver of the vehicle.

17. The method for visual awareness confirmation of claim 16, comprising:
formulating the question related to the feature based on the awareness state of the driver of the vehicle; and
presenting the question to the driver of the vehicle based on the awareness state of the driver.

18. The method for visual awareness confirmation of claim 16, comprising presenting the question to the driver of the vehicle based on an awareness threshold.

19. The method for visual awareness confirmation of claim 16, comprising identifying the feature of the operating environment based on an eye gaze location of the driver of the vehicle.

20. The method for visual awareness confirmation of claim 16, comprising inferring driver awareness based on a steering wheel pressure associated with a steering wheel of the vehicle.

* * * * *